United States Patent [19]

Whitcomb et al.

[11] Patent Number: 4,716,680
[45] Date of Patent: Jan. 5, 1988

[54] PLANT GROWTH CONTAINER AND METHOD

[76] Inventors: Carl E. Whitcomb, Rte. 5, Box 174, Stillwater, Okla. 74074; Harold Stephens, P.O. Box 506, Jenks, Okla. 74037

[21] Appl. No.: 856,653

[22] Filed: Apr. 28, 1986

[51] Int. Cl.⁴ ............................................. A01G 23/02
[52] U.S. Cl. ............................................. 47/73; 47/66
[58] Field of Search ............... 52/473; 249/135; 47/73, 47/66, 85

[56] References Cited

U.S. PATENT DOCUMENTS 3,667,159  6/1972  Todd ............................. 47/34.13
4,442,628  4/1984  Whitcomb ......................... 47/66
4,497,132  2/1985  Whitcomb ......................... 47/66

*Primary Examiner*—Robert A. Hafer
*Assistant Examiner*—Bradley M. Lewis
*Attorney, Agent, or Firm*—Laney, Dougherty, Hessin & Beavers

[57] ABSTRACT

An improved growth container and method for growing a plant to be transplanted are provided. The interior of the side walls of the container have a lattice of root-trapping recesses therein each having a trough with a pointed end for directing roots growing therein downwardly and outwardly so as to form trapped lateral root tips. The side panels can be disconnected and moved laterally apart to prevent damage to the root tips trapped in the recesses.

20 Claims, 5 Drawing Figures

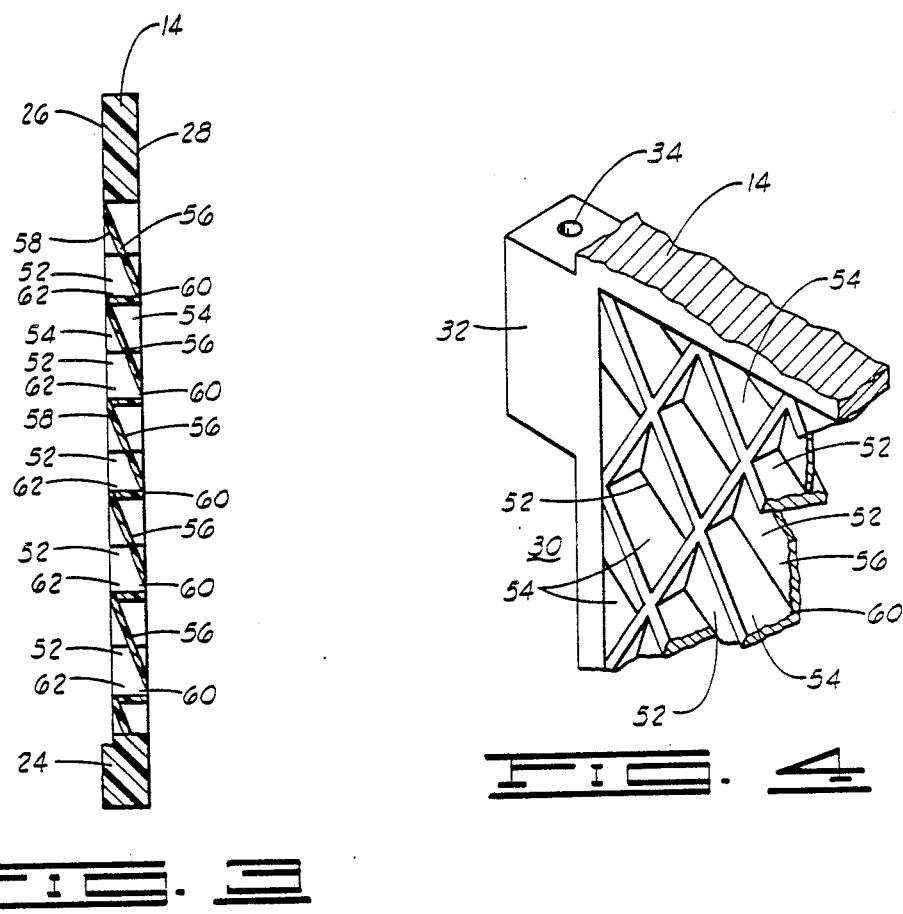
FIG. 3
FIG. 4
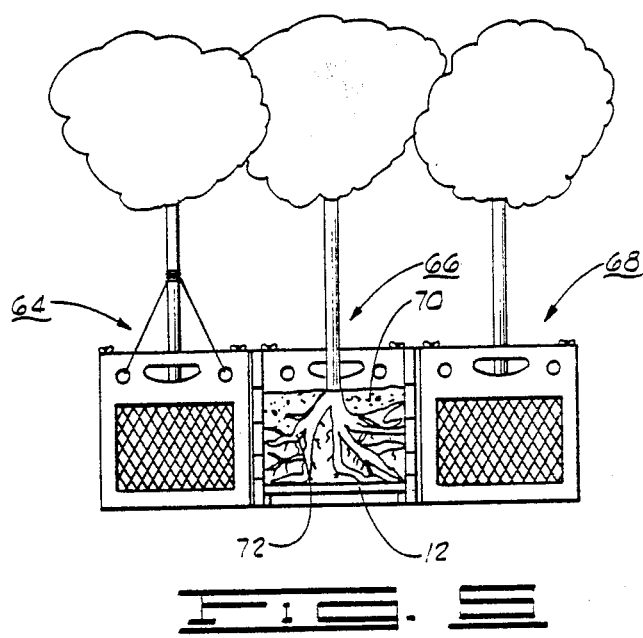
FIG. 5

PLANT GROWTH CONTAINER AND METHOD

BACKGROUND OF THE INVENTION

1. Field of the Invention

The present invention relates generally to plant growing methods and containers, and more particularly, to methods and containers for growing plants such as shrubs or trees in preparation for transplanting.

2. Description of the Prior Art

Trees and shrubs and other plants intended to be transplanted have for some time been grown above ground in bags or containers. Plants held in bags or containers can be grown at a faster rate than those grown in the ground, are more easily tended, and because the roots of the plants are not severed when the plants are transplanted, transplanting is less traumatic on the plant and is more easily accomplished.

With respect to trees and shrubs, it is often desired to grow the trees or shrubs in the ground until the tree or shrub is sufficiently large as to be commercially desirable for transplantation. At this point the tree is removed from the ground, care being taken to retain a ball of soil around the major root structures of the tree. The soil and roots are wrapped in burlap to retain the soil and roots in a transplantable condition and to allow roots to grow in the retained soil. The burlap wrapped trees are then placed together and the burlap balls are covered with mulch and sawdust to prevent drying. When transplanting to the soil is desired, the burlap covered root ball is placed in the ground and covered with soil. The burlap decomposes and the roots grow into the surrounding soil.

A problem with the burlap covered root balls is that the burlap prematurely decomposes and allows the root ball to fall apart. Further, the trees produce roots which extend through the burlap container out into the mulch or sawdust and these roots are lost during transplanting producing stress on the plant. Still further, use of the burlap covered root ball is untidy and not commercially as aesthetic for a nursery or the like.

Other than burlap bags, other devices have been used to retain the soil and roots of plants and trees prior to transplanting. These devices have included metal cans with holes punched in them and cylindrical or conical plastic containers. A problem with the cylindrical containers is that as roots grow downward within the containers, the round bottom of the container causes spiral root growth. Spiral root growth is damaging to the plant in that such root growth does not provide lateral anchorage for the plant when transplanted and the spiral roots do not extend into the soil to gather nutrients. Some containers have openings in the bottom to terminate the spiral root growth. When a root extends through an opening, it is air pruned and growth of this root stops.

Landscape plants have also been grown in square, bottomless containers placed on wire surfaces where roots reaching the bottom of the container are air pruned. However, most of the root tips produced end up at the bottom of the container, and the requirement of placing the containers on wire screen surfaces generally makes the practice uneconomical. Further, such open bottom containers are not easily moved without spilling or losing the growth medium contained therein.

More recently, containers have been developed for controlling spiral root growth whereby the root tips are physically trapped by surfaces in the container and are prevented from elongating or the circling root tips are caused to pass through vertical openings in the sides of the container whereby the tips are air pruned. An example of the root trapping type of container is described in U.S. Pat. No. 4,442,628 issued Apr. 17, 1984. An example of a container including vertical side wall openings for air pruning circling roots is described in U.S. Pat. No. 4,497,132 issued Feb. 5, 1985. While such root trapping and air pruning containers have been utilized successfully, some spiral root growth still takes place and the development of lateral root growth and root tips has been less than optimum.

By the present invention an improved container for growing plants intended to be transplanted is provided whereby spiral root growth is prevented and the development of lateral root and branched root tips along and around the sides of the container is maximized. Particularly, the present invention is well suited for large plants such as trees and shrubs.

SUMMARY OF THE INVENTION

An improved container for growing a plant intended to be transplanted is provided. The container is comprises of a set of upwardly extending side panels each having an interior surface and an exterior surface, and each having vertically extending edge joints adapted so that the side panels can be joined together to form a container with an open top. The edge joints the side panels are adapted to be disconnected and moved laterally outwardly apart. The interior surface of each of the side panels has a lattice of root trapping recesses therein. Each of the recesses includes a laterally outwardly extending trough with a pointed end for directing roots growing therein downwardly and outwardly whereby they are trapped at the pointed end of the trough. Preferably the lattice of recesses substantially covers the sides of the container so that a great number of branched, root tips will be formed all around the interior of the container.

The container also preferably includes a square or rectangular bottom panel and the side panels extend upwardly from the periphery of the bottom panel so that the container is generally cuboid in shape. The cuboid shape rectangular bottom of the container prevents spiral root growth and the downwardly growing roots not captured by the side walls are trapped in the corners of the container. This also promotes lateral root growth which, in turn, promotes the creation of the multiple lateral root tips in the root trapping recesses. Methods of growing plants for transplantation in a growing medium contained in a container are also provided.

It is, therefore, an object of the present invention to provide an improved container for growing plants intended to be transplanted.

Another object of the present invention is the provision of an improved container for growing plants intended to be transplanted.

Another object of the present invention is the provision of an improved container and method for growing a plant intended to be transplanted whereby spiral root growth is prevented and the development of lateral root tips along and around the sides of the container is maximized.

A further object of the present invention is the provision of a container and method for growing a plant intended to be transplanted whereby the growth of lateral root tips is promoted while, at the same time, the root tips are confined.

Yet another object of the present invention is the provision of a container and method for growing a plant intended to be transplanted which provides for an improved storage, moving and transplanting of the plants.

Other and further objects, features and advantages of the present invention will be readily apparent to those skilled in the art upon the reading of the description of the preferred embodiments which follows when taken in conjunction with the accompanying drawings.

BRIEF DESCRIPTION OF THE DRAWINGS

FIG. 3 is a cross-sectional view of the panel of FIG. 2 taken along the lines as shown in FIG. 2.

FIG. 4 is an enlarged perspective view of a section of the interior of the panel shown in FIG. 2.

FIG. 5 is a side elevational view of containers of the present invention with trees growing therein.

DESCRIPTION OF PREFERRED EMBODIMENTS

Figure 1:
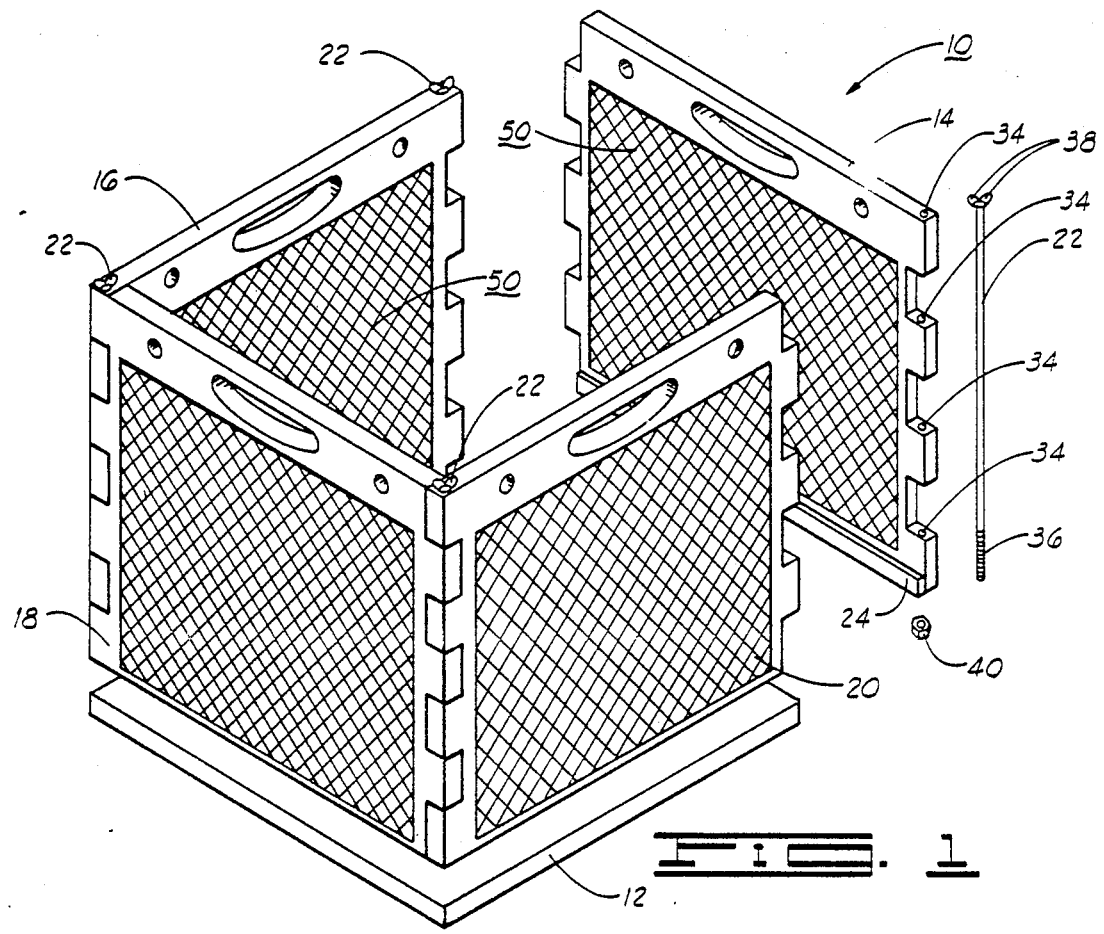
FIG. 1 is a perspective, partially exploded view of a plant growing container of the present invention.

Plants growing in containers either from a germinating seed or from a transplanted tree or shrub, typically have a tap root which grows faster and farther than any of the other roots of the plant. The tap root grows quickly toward the bottom of the container and, when it reaches the bottom of the container, changes direction in response to the container and continues to grow until it becomes physically trapped or exits the container and is air pruned. Many containers have a hole or holes at the bottom of the container to allow air pruning of the tap root. Once the tap root growth is terminated, the apical dominance of the root tip is lost and the development of secondary lateral roots along the length of the tap root is promoted. The secondary lateral roots generally grow outwardly toward the sides of the container and slightly downwardly. When the lateral roots contact the sides of the container, they grow downwardly towards the bottom of the container where they continue to grow in a circular pattern until they are trapped or terminated by air pruning. The typical cylindrical container promotes the circular root growth at the bottom of the container as described.

When plants having root growth of the type described are transplanted, the downwardly oriented roots which have been concentrated at the bottom of the container provide little or no lateral anchorage of the plants and the root tips are at a depth in the soil where aeration is less favorable. In addition, the downwardly oriented roots are intermingled with each other and such roots increase in diameter with age and exert pressure on one another which restricts the normal flow of water and nutrients from the root tips to the top of the plant as well as the downward flow of energy from the leaves.

In the transplantation of trees and shrubs, often a container is not used. Rather, a tree is grown in the field until it reaches a desired size for removal. At this point, the plant is removed from the ground and a ball of soil surrounding the tap root and lateral roots is wrapped with burlap. The burlap wrapped trees are placed closely together and covered with mulch and sawdust to prevent drying. In this position, the roots in the burlap covered root ball grow out through the burlap into the surrounding mulch and sawdust. When moved, however, the roots which have grown through the burlap are destroyed causing shock to the plant.

The present invention provides an improved plant growth container and method for growing and transplanting a plant whereby lateral root growth is promoted and production of lateral root tips which are not damaged by transplantation is maximized. Moreover, an efficient, aesthetic container and transplantation method are provided. Upon transplantation, root tips are present at all levels in the growth medium and the root tips, being undamaged, quickly grow in all directions and anchor the plant for providing rapid absorption of water and nutrients.

Referring now to the drawings, and particularly to FIGS. 1-4, a plant growing container of the present invention is illustrated and generally designated by the numeral 10. The container is comprised of a square bottom panel 12 and four upwardly extending side panels 14, 16, 18 and 20. The side panels 14-20 are generally rectangular and are joined at their vertically extending lateral edges by mortise and tenon joints having connecting rods 22 extending therethrough. Each of the side panels 14-20 are identical in shape and construction. The bottom panel 12 rests on a ledge 24 which extends inwardly from the bottom of each of the side panels. Thus, the container 10 has a generally cuboid shape with an open top.

Figure 2:
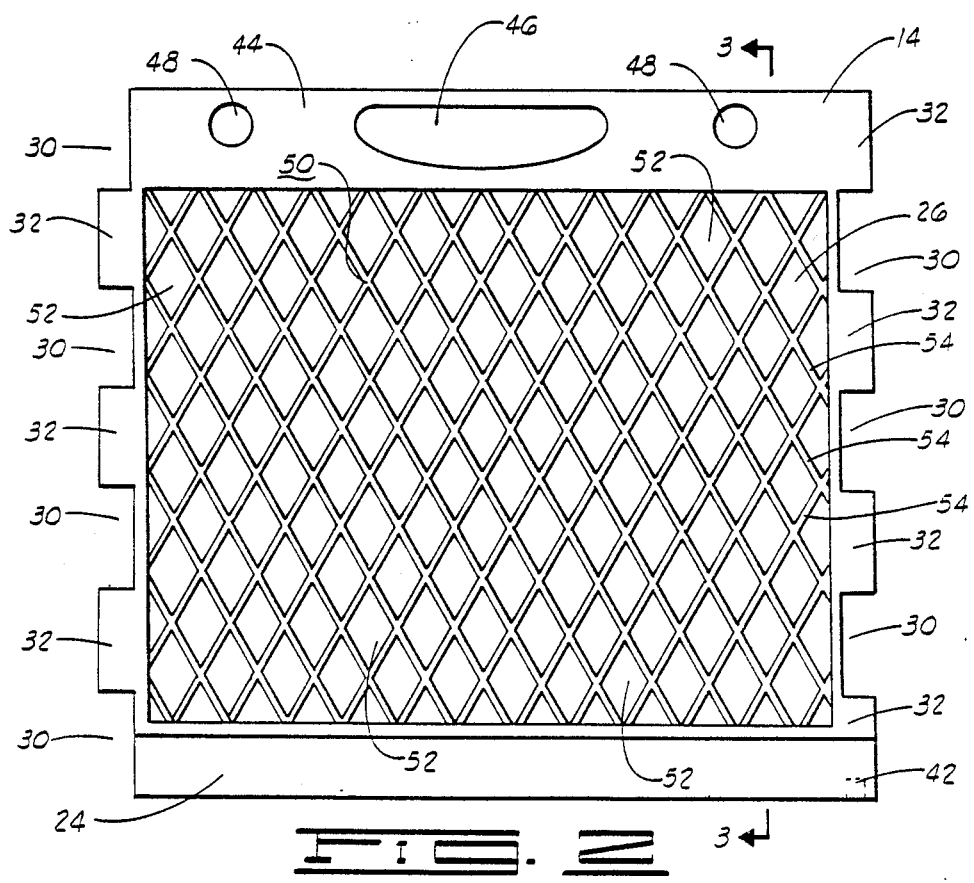
FIG. 2 is a side elevational view of the interior of one of the side panels of the container shown in FIG. 1.

Referring particularly to FIGS. 2-4, the side panel 14 of the container 10 has an inwardly facing surface 26 and an outwardly facing surface 28. Mortises 30 and tenons 32 alternate on the opposite lateral edges of the panel 14 to allow adjacent panels to be securely connected together. A shaft opening 34 extends through each of the tenons 32 so that the connecting rod 22 can be inserted therethrough to securely join the side panels together when the adjoining mortise and tenons are mated. The connecting rod 22 is threaded at its bottom end 36 and has wings 38 extending from the upper end of the rod 22 to allow the rod 22 to be manually rotated. A nut 40 is received in a nut-receiving recess 42 in the bottom of the bottom tenon 42 and receives the threaded end 36 of the rod 22.

A border 44 at the top of the side panel 14 has a handle opening 46 centrally disposed therein. Each of the side panels has a handle opening therein so that opposite handles can be manually grasped for moving and carrying the container and plants therein. Tie holes 48 are provided on opposite sides of the handle opening 46 in the border 44 to allow guy wires and the like to be tied to the container and to the trees or shrubs growing therein to stablize the plant.

Extending over the entire interior surface of the side panel 14 between the border 44, the ledge 24 and the mortise and tenon joints 30 and 32 is a lattice 50 of diamond-shaped recesses 52. The recesses 52 are bounded by side walls 54 which extend laterally outwardly and diagonally in a criss-crossing pattern through the side panel 14 to form the lattice. The walls 54 form rhombohedrons which are diagonally cut by slanting walls 56 which form the inwardly facing surface of each of the recesses 52. The slanting walls 56 slant downwardly and outwardly from the pointed top 58 of the rhombohedron recesses 52 to the pointed bottom 60 at the outer edge of the rhombohedron recesses 52.

As can be seen, each of the recesses 52 includes a trough 62 at the bottom thereof which terminates at the pointed end 60 where the slanting wall 56 meets the outer edge of the bottom of the recess. This provides an enclosed root-trapping recess which will direct roots which grow into the recess downwardly and outwardly to the pointed end 60 so that the root tip will be trapped at the pointed end 60 and will terminate its growth. The lattice of side walls 54 also provides, in honeycomb fashion, great strength to the side panels structure.

The side panels 14–20 are preferably constructed of a plastic material since plastic is easily molded to the required shape and will not decompose under the conditions for growing plants. This will allow the side panels 14–20 to be used again and again through many transplantings.

The bottom panel 12 can be constructed of various materials and preferably includes a smooth upwardly facing surface. Most preferably, the panel 12 is constructed of an organic, decomposable material such as wood, particle board or the like. The smooth surface of the bottom panel directs roots to the side panels where they are trapped, and the bottom panel 12 can remain in the ground after transplanting Referring particularly to FIG. 5, three containers 64, 66 and 68 are shown side-by-side to illustrate that the cuboid shape of the container efficiently allows close packing of the containers. The containers 64–66 are shown with trees growing therein and the front side panel of the container 66 has been removed to reveal the soil growing medium 70 and root structure 72 therein. As can be seen, a plant which grows within the container will have a root structure confined by the root-trapping shape of the container so as to maximize lateral root growth. A tap root which grows downwardly and encounters the bottom panel 12 will grow to a side panel or one of the corners at the bottom of the container and be trapped at the point of contact with the panel or corner. This will promote lateral root growth and the lateral root growth will encounter the lattice of root-trapping recesses on the interior of the container. The lateral root growth will, in turn, terminate at the pointed ends of the trough of each of the recesses promoting further lateral root growth into the other recesses until contained terminated lateral root tips surround the interior of the container. Upon transplantation these root tips, present at all levels in the growth medium, will grow in all directions, quickly anchoring the plant and providing rapid absorption of water and nutrients.

Referring again to FIGS. 1–5 it can be seen that the side panels 14–20 are adapted to be joined together and be disconnected to form the cuboid shape of the container. More particularly, the side panels, upon removal of the connecting rods 22 can be moved laterally away from the soil 70 and root structure 72 so as not to damage the root tips trapped in the recesses 52.

Thus, the present invention provides an improved method of growing a plant in a growing medium in a container and then transplanting that plant to a second growing medium in the ground or the like. The improved method providing the side walls of the container with a lattice of root-trapping recesses as described above so as to maximize the lateral root tips and to provide root tips at all levels of the growing medium. A transplantation space or hole is then provided in the second medium, for example a desired field location, and the container 10 and the plant growing therein are placed in the hole or space and the connecting rods 22 are removed from the side panels 14–20. The side panels 14–20 are then moved laterally apart so as not to damage the root tips in the recesses 52 and the hole is filled with soil or growing medium to surround the now exposed roots of the plants. The bottom panel 12 can remain in the ground and decompose.

The method and container of the present invention thus result in the rapid growing of a plant having a root system comprised of a plurality of root tips positioned at all levels along the side wall of the container. Upon transplantation, new root growth extends from the root tips in all directions around the plant quickly anchoring the plant and providing water and nutrients required for additional plant growth.

While preferred embodiments of the present inventions have been described for the purpose of this disclosure, numerous changes in the construction and arrangement of the container parts will suggest themselves to those skilled in the art, which changes are encompassed within the spirit of this invention as defined by the appended claims.

What is claimed is:

1. A container for a plant intended to be transplanted, comprising:
   a set of upwardly extending side panels each having an interior surface and an exterior surface, and each having vertically extending edge joints adapted so that said side panels can be joined together to form a container with an open top and further adapted so that said joined side panels can be disconnected and moved laterally outwardly apart; and
   said interior surface of each of said side panels having a lattice of root trapping recesses therein, each of said recesses including a wall that extends from the interior to the exterior of said side panel and a laterally extending which connects with said wall forming growing therein downwardly and outwardly so as to be trapped therein.

2. The container of claim 1 wherein each of said recesses has outwardly extending sides, the bottom of which sides forms said trough and wherein each of said recesses has an interior facing wall which slants downwardly and outwardly to the pointed end of said trough.

3. The container of claim 2 wherein said outwardly extending sides of said recesses have a generally rhombohedron shape.

4. The container of claim 1 wherein said panels are generally rectangular and wherein said edge joints are mortise and tenon joints.

5. The container of claim 4 wherein at least two of said panels have handle openings therein for manual grasping and carrying of said container.

6. The container of claim 1 which further comprises a bottom panel, the periphery of which joins with said side walls to form the container with an open top.

7. The container of claim 6 wherein said bottom panel rests upon a ledge extending from the bottom of said side panels.

8. The container of claim 7 wherein said side panels are comprised of plastic and wherein said bottom panel is comprised of a decomposable organic material.

9. The container of claim 8 wherein said side panels and said bottom panel are generally rectangular and form a generally cuboid container.

10. In an open-topped container for growing a plant intended to be transplanted having a bottom wall, and an upwardly extending side wall connected thereto, the improvement which comprises said side wall having a wall that extends from the interior to the exterior of said side panel and a lattice of root-trapping recesses therein, each of said recesses having a laterally extending trough which connects with said wall forming a pointed end for directing roots growing therein downwardly and outwardly so as to be trapped therein.

11. The container of claim 10 wherein each of said recesses has outwardly extending sides, the bottom of which sides forms said trough and wherein each of said recesses has an interior facing wall which slants downwardly and outwardly to the pointed end of said trough.

12. The container of claim 11 wherein said outwardly extending sides of said recesses have a generally rhombohedron shape.

13. The container of claim 10 wherein said side wall can be disassembled and moved laterally outwardly from a root ball therein so as not to damage roots trapped in said recesses.

14. The container of claim 13 wherein said bottom wall rests upon a ledge extending the bottom of said side wall.

15. The container of claim 14 wherein said bottom wall is comprised of a decomposable organic material and said side wall is comprised of plastic.

16. The container of claim 15 wherein said container is generally cuboid in shape.

17. The container of claim 16 wherein said side wall has handle openings therein for manual grasping and carrying of said container.

18. In a method of growing and transplanting a plant from one growing medium in an open-topped container having a bottom wall and side wall to a second growing medium, the improvement comprising providing said side wall with a lattice of root-trapping recesses, each of said recesses having a wall that extends from the interior to the exterior of said side panel and a laterally extending trough which connects with said wall forming a pointed end whereby roots growing in said container are directed downwardly and outwardly within each of said recesses so as to be trapped therein to form a lattice of trapped roots extending about the sides of the container.

19. The method of claim 18 wherein each of said recesses has outwardly extending sides, the bottom of which sides forms said trough, and wherein each of said recesses has an interior facing wall which slants downwardly and outwardly to the pointed end of said trough.

20. The method of claim 19 which further comprises:
forming a transplant space in said second growing medium for receiving said container;
placing said container in said space;
disconnecting said side walls;
moving said side walls laterally apart so as not to damage roots trapped in said recesses;
removing said side walls from said transplant space; and
filling said space with growing medium to surround said roots.

* * * * *

UNITED STATES PATENT AND TRADEMARK OFFICE
CERTIFICATE OF CORRECTION

PATENT NO. : 4,716,680
DATED : January 5, 1988
INVENTOR(S) : Carl E. Whitcomb and Harold Stephens It is certified that error appears in the above-identified patent and that said Letters Patent are hereby corrected as shown below:

Column 2, line 1, change "circuling" to --circling--;
Column 2, line 7, change "circuling" to --circling--;
Column 2, line 28, after "joints" and before "the", insert --of--;
Column 2, delete the paragraph appearing at lines 57 through 59, as follows: "Another object of the present invention is the provision of an improved container for growing plants intended to be transplanted.";
Column 6, line 36 (claim 1), after "extending" and before "which" insert --trough--; and
Column 6, line 37, after "forming" and before "growing" insert --a pointed end for directing roots--.

Signed and Sealed this

Thirty-first Day of May, 1988

Attest:

DONALD J. QUIGG

Attesting Officer

Commissioner of Patents and Trademarks